United States Patent [19]

Hayashi

[11] Patent Number: 5,237,420
[45] Date of Patent: Aug. 17, 1993

[54] ELECTRONIC APPARATUS HAVING BROADCASTING SYSTEM IDENTIFIER DISPLAYING CAPABILITY

[75] Inventor: Toshihide Hayashi, Kanagawa, Japan

[73] Assignee: Sony Corporation, Tokyo, Japan

[21] Appl. No.: 763,204

[22] Filed: Sep. 20, 1991

[30] Foreign Application Priority Data

Sep. 27, 1990 [JP] Japan .................. 2-258663

[51] Int. Cl.$^5$ .............................................. H04N 5/50
[52] U.S. Cl. ................... 358/188; 358/192.1; 358/142; 455/158.5; 380/10
[58] Field of Search .............. 358/192.1, 12, 188, 358/86, 142, 143; 455/158.4, 158.5, 159.1, 159.2; 116/DIG. 41; 380/10

[56] References Cited

U.S. PATENT DOCUMENTS

| | | | |
|---|---|---|---|
| 3,987,401 | 10/1976 | Irving | 455/159.2 |
| 4,241,361 | 12/1980 | Kamiya | 358/192.1 |
| 4,348,691 | 9/1982 | Mistry | 358/86 |
| 4,931,855 | 6/1990 | Salvadorini | 358/142 |
| 5,103,314 | 4/1992 | Keenan | 358/193.1 |
| 5,132,793 | 7/1992 | Hirahata et al. | 358/12 |
| 5,152,011 | 9/1992 | Schwolo | 358/192.1 |

*Primary Examiner*—John K. Peng
*Assistant Examiner*—Jeffrey S. Murrell
*Attorney, Agent, or Firm*—Lewis H. Eslinger; Jay H. Maioli

[57] ABSTRACT

An electronic apparatus, such as a television receiver, having broadcasting system identifier displaying capability is capable of receiving both signals of a broadcasting system in which the transmitter scrambles original signals and transmits unintelligible scrambled signals and the receiver unscrambles the scrambled signals to reproduce the intelligible original signals, and signals of a broadcasting system in which the transmitter transmits original signals without scrambling the same and the receiver reproduces the original signal. The electronic apparatus comprises broadcasting system selecting means for selecting a desired broadcasting system, and broadcasting system identifier displaying means capable of displaying universal character representations representing broadcasting system in different colors assigned respectively to the broadcasting systems.

1 Claim, 2 Drawing Sheets

ELECTRONIC APPARATUS HAVING BROADCASTING SYSTEM IDENTIFIER DISPLAYING CAPABILITY

BACKGROUND OF THE INVENTION

1. Field of the Invention

The present invention relates to an electronic apparatus having broadcasting system identifier displaying capability and, more specifically, to a novel electronic apparatus having broadcasting system identifier displaying capability capable of discriminating a plurality of broadcasting systems by universal identifiers of different colors.

2. Description of the Prior Art

Recently, television broadcasting mode has progressively been diversified. For example, a subscription television service system is to start television broadcasting by using the broadcasting satellite BS-3a. In the subscription television service system, the transmitting device scrambles signals so that the transmitted signals are unintelligible, and transmits the scrambled signals together with control signals for unscrambling the scrambled signals. The receiving device unscrambles the received scrambled signals to reproduce the intelligible original signals. Video signals are scrambled, for example, by a line rotation system which scrambles a picture with respect to a horizontal direction by interchanging signals on the opposite sides of cut points on a scanning line or by a line permutation system which scrambles a picture with respect to a vertical direction by rearranging scanning lines for scrambling.

Another broadcasting system enables a current television receiver of a standard television system such as a NTSC television system or a PAL television system, to receive high-definition television. The television receiver of the standard television system needs a down converter to change the aspect ratio from 16:9 to 4:3 in receiving high-definition television.

As new television broadcasting systems are inaugurated in addition to the current standard television broadcasting system, the number of channels assigned to the television broadcasting systems increases and a channel number is double-assigned to different television broadcasting systems, so that a selected channel cannot be identified only by the channel number. When a program of an unintended television broadcasting system is selected by erroneous program selecting operation, in particular, the television broadcasting system of the selected program cannot readily be identified.

The television broadcasting system may be indicated by characters and the like on the screen of a television receiver to identify the television broadcasting system by which the selected program is being broadcast. However, such a television broadcasting system identifying method needs character data to indicate all the television broadcasting systems by characters, and a memory of a large capacity for storing character data for operating a character generator to generate many character representations for identifying many television broadcasting systems.

SUMMARY OF THE INVENTION

Accordingly, it is an object of the present invention to provide an electronic device having broadcasting system identifier displaying capability capable of displaying universal broadcasting system identifiers for identifying a plurality of broadcasting systems in different colors assigned respectively to the broadcasting systems.

In a first aspect of the present invention, an electronic device having broadcasting system identifier displaying capability is capable of receiving both signals of a broadcasting system in which the transmitter scrambles the time series of original signals and transmits the scrambled signals, and the receiver unscrambles the received scrambled signals to reproduce the original signals and displays pictures on the screen and generates sounds, and signals of a broadcasting system in which the transmitter transmits original signals without scrambling the same and the receiver reproduces the original signals. The electronic device in the first aspect of the present invention comprises broadcasting system selecting means for selecting a desired broadcasting system, and broadcasting system identifier displaying means for displaying universal identifiers representing broadcasting systems in different colors assigned respectively to the broadcasting systems.

In a second aspect of the present invention, an electronic device having broadcasting system identifier displaying capability is capable of receiving both signals of a high-definition television system, and signals of a standard television system which is inferior to the high-definition television system in the quality of picture. The electronic device in the second aspect of the present invention comprises broadcasting system selecting means for selecting a desired broadcasting system, and broadcasting system identifier displaying means for displaying universal identifiers representing the broadcasting systems in different colors assigned respectively to the broadcasting systems.

BRIEF DESCRIPTION OF THE DRAWINGS

The above and other objects, features and advantages of the present invention will become more apparent from the following description taken in connection with the accompanying drawings in which.

DETAILED DESCRIPTION OF THE PREFERRED EMBODIMENTS

The present invention as applied to a television receiver will be described hereinafter in connection with the accompanying drawings.

A NTSC color television broadcasting system (hereinafter referred to as "nonscramble broadcasting system"), a subscription television service system (hereinafter referred to as "scramble broadcasting system") and a high-definition broadcasting system are satellite broadcasting systems using a broadcasting satellite. Therefore these broadcasting systems can be discriminated from terrestrial broadcasting systems by a character representation "BS" displayed on the screen b of the television receiver. However, since those three satellite broadcasting systems cannot be discriminated from each other only by the character representation "BS", character representations "BSs" of different colors are assigned respectively to the different satellite broadcasting systems.

Figure 1A:
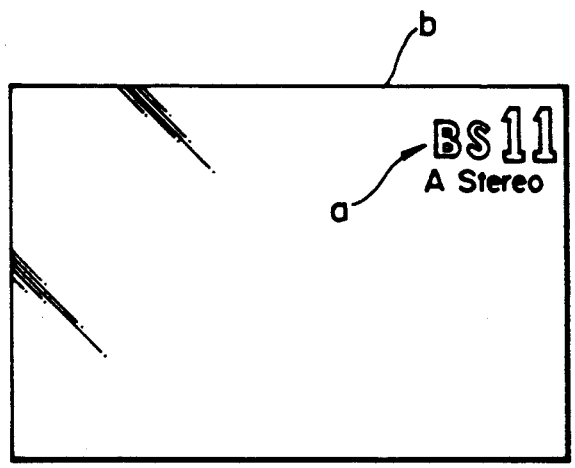
FIGS. 1A and 1B are front views of the screen of an electronic apparatus in a preferred embodiment according to the present invention, showing a broadcasting system identifier for a nonscramble broadcasting system and a broadcasting system identifier for a scramble broadcasting system, respectively, displayed on the screen.
Figure 1B:
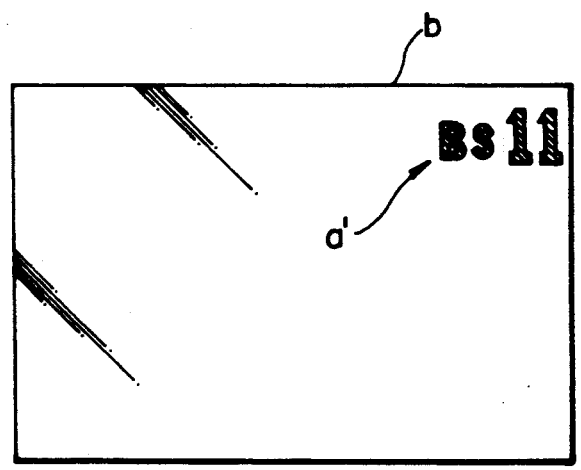

For example, FIG. 1A shows a green character representation "BS 11" indicated at a for the channel 11 of the nonscramble broadcasting system; FIG. 1B shows a cyan character representation "BS 11" indicated at a' for the channel 11 of the scramble broadcasting system. The channel 11 of the high-definition broadcasting system may be represented by a character representation "BS 11" of a color other than green and cyan.

Figure 2:
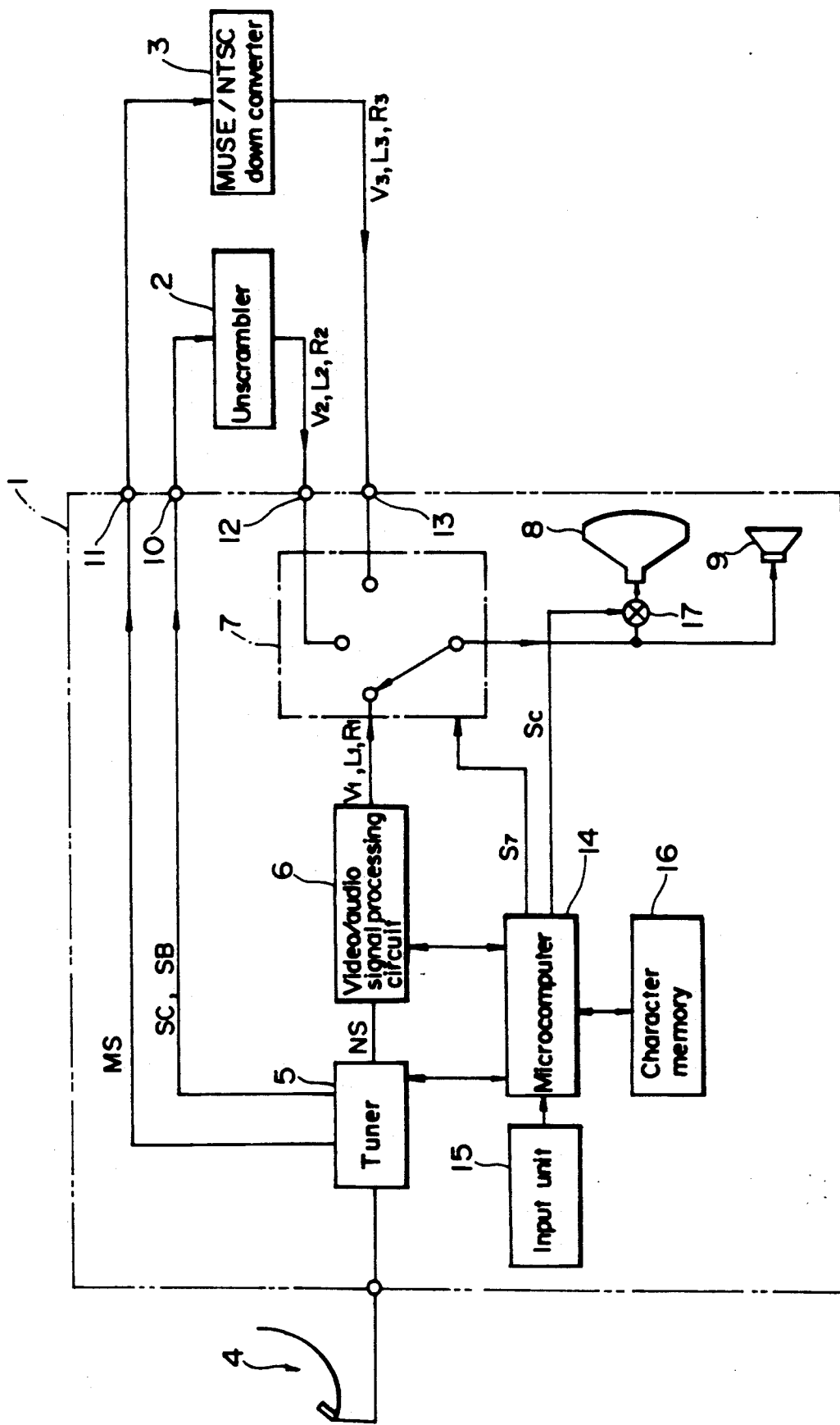
FIG. 2 is a general block diagram of the electronic configuration of the electronic apparatus.

Referring to FIG. 2, the television receiver 1 is provided with an external unscrambler 2 and an external MUSE/NTSC down converter 3. In FIG. 2, a plurality of signal lines are indicated by a single line, and signals transmitted through the signal line are identified by symbols.

A signal BS-IF of an intermediate frequency received by an antenna 4 is transferred to a tuner 5 capable of dealing with high-definition television signals. Then, a nonscramble signal NS detected by the tuner 5 is transferred to a video/audio signal processing circuit 6. The video/audio signal processing circuit 6 processes the nonscramble signal NS to send a video signal $V_1$ of the NTSC broadcasting system, an R-channel stereophonic signal $R_1$, and an L-channel stereophonic signal $L_1$ through a switching circuit 7 to a CRT 8 and loudspeakers 9 (only one of the loudspeakers 9 is shown) or to external output terminals, not shown.

Among the output signals of the tuner 5, a scramble signal SC, and a bit stream signal SB for unscrambling are sent through a scramble signal output terminal 10 to the unscrambler 2.

When a high-definition television signal is received, the tuner 5 sends a MUSE signal MS through a MUSE signal output terminal 11 to the MUSE/NTSC down converter 3.

Video signals of the NTSC broadcasting system and stereophonic signals provided by the unscrambler 2 and the MUSE/NTSC down converter 3 are applied to external signal input terminals 12 and 13. The unscrambler 2 applies a video signal $V_2$ and audio signals $R_2$ and $L_2$ to the external signal input terminal 12, and the MUSE/NTSC down converter 3 applies a video signal $V_3$ and audio signals $R_3$ and $L_3$ to the external signal input terminal 13. Then, the switching circuit 7 sends one of three sets of signals $V_1$, $R_1$ and $L_1$, $V_2$, $R_2$ and $L_2$ and $V_3$, $R_3$ and $L_3$ to the CRT 8 and the loudspeakers 9. In FIG. 2, functions of the switching circuit 7 which are carried out by a plurality of switching elements are represented conceptually by a single switch.

A microcomputer 14 controls the system including a television receiver 1, the unscrambler 2 and the MUSE/NTSC down converter 3. The microcomputer 14 controls the components of the circuit including the tuner 5 and the video/signal processing circuit 6 according to command signals provided by an input unit 15, such as a remote controller or a control panel. The microcomputer 14 gives a switching signal $S_7$ corresponding to a broadcasting system specified by the input unit 15 to the switching circuit 7 to select video signals and audio signals of the selected broadcasting system, and gains access to a character memory 16 to make a character generator generate a desired character signal Sc. A mixer 17 combines the character signal Sc and video signals given thereto through the switching circuit 7. The microcomputer 14 specifies a color in which the character signal Sc is to be displayed.

In operation, the tuner 5 sends a nonscramble signal NS through the video/audio signal processing circuit 6 to the switching circuit 7 and the microcomputer 14 gives a switching signal $S_7$ to select the set of signals $V_1$, $R_1$, and $L_1$, when a desired channel of the nonscramble broadcasting system is selected by the input unit 15. The microcomputer 14 gains access to the character memory 16 to make the character generator generate a character representation a including characters "BS" and numerals indicating the selected channel, and gives a color signal specifying "green". The character representation and the color signal are applied to the mixer 17. Consequently, the character representation a is displayed in green on the screen b as shown in FIG. 1A.

When a channel of the scramble broadcasting system is selected by the input unit 15, the microcomputer 14 controls the tuner 5 to send a scramble signal SC and a bit stream signal SB through the scramble signal output terminal 10 to the unscrambler 2, and gives a switching signal $S_7$ to the switching circuit 7 to select a video signal $V_2$ and audio signals $R_2$ and $L_2$. Then, the unscrambler 2 unscrambles the scramble signal SC and sends the unscrambled video signal $V_2$ and the unscrambled audio signals $R_2$ and $L_2$ through the external input terminal 12 to the television receiver 1. The unscrambled video signal $V_2$ and the unscrambled audio signals $R_2$ and $L_2$ are applied respectively to the CRT 8 and the loudspeakers 9. At the same time, the microcomputer 14 gains access to the character memory 16 to make the character generator generate a character signal Sc and provides a color signal specifying cyan. The mixer 17 combines the character signal Sc and the video signal $V_2$. Consequently, a character representation indicating the selected channel of the selected broadcasting system is displayed in cyan as shown in FIG. 1B.

When a channel of the high-definition television system is selected by the input unit 15, the microcomputer 14 controls the tuner 5 to send a MUSE signal provided by the tuner 5 through the MUSE signal output terminal 11 to the MUSE/NTSC down converter 3, and controls the switching circuit 7 so that the output signals $V_3$, $R_3$, and $L_3$ of the MUSE/NTSC down converter 3 are selected. The mixer 17 combines the video signal $V_3$ and a color signal Sc specifying a color other than green and cyan, and applies the mixed signal to the CRT 8. The audio signals $R_3$ and $L_3$ are applied to the loudspeakers 9.

The television receiver 1 may be provided with external input terminals to be connected to external equipment.

Thus, the different broadcasting systems are identified respectively by different colors and hence special identifiers need not be assigned to the different broadcasting systems.

The present invention is applicable also to a television receiver integrally provided with an unscrambler and a down converter as internal circuits, and a television receiver capable of dealing with scramble signals of the high-definition television system and signals of the terrestrial high-definition television system.

Although the invention has been described in its preferred form with a certain degree in particularity, obviously many changes and variations are possible therein. It is therefore to be understood that the present invention may be practiced otherwise than as specifically described herein without departing from the scope and spirit thereof.

What is claimed is:

1. A television receiving system for receiving and displaying video signals transmitted according to a plurality of different broadcasting systems including unscrambled signals, scrambled signals, and high-definition television signals in which at least some channel numbers in each of said plurality of different broadcasting systems are the same, the receiving system comprising:

an antenna receiving signals corresponding to said plurality of different broadcasting systems;

a tuner capable of receiving nonscrambled signals, scrambled signals, and high-definition television signals and connected to said antenna;

a video processing circuit connected to receive a nonscrambled signal from said tuner for providing a processed video signal;

an unscrambling circuit connected to receive a scrambled signal and an unscrambling bit stream signal from said tuner for providing an unscrambled video signal;

a down-converter connected to receive a multiple sub-Nyquist encoded, high-definition television signal from said tuner for providing a converted video signal;

a selector switch connected to said processing circuit, to said unscrambling circuit, and to said downconverter circuit for selectively connecting one of said processed video signal, said unscrambled video signal, or said converted video signal for display;

a user input unit for providing a command signal indicating a channel of a broadcasting system for display;

a microcomputer connected to control said tuner and said video processing circuit in response to a command signal from said input unit and for providing a switching signal corresponding to a broadcasting system specified by the command signal from said input unit for causing said selector switch to connect one of the video signals connected thereto for display;

a character memory controlled by said microcomputer for producing a color character signal corresponding to the command signal from said input unit, said character signal having a color specified by said microcomputer and in which the color is different for different respective broadcast systems; and a mixer for mixing said color character signal and the video signal output from said selector switch and producing a mixed signal for display.

* * * * *